(12) United States Patent
Masuda (10) Patent No.: US 9,692,345 B2
(45) Date of Patent: Jun. 27, 2017

(54) MOTOR DRIVE DEVICE

(71) Applicant: Yui Masuda, Iwata (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/855,758

(22) Filed: Sep. 16, 2015

(65) Prior Publication Data

US 2016/0006388 A1 Jan. 7, 2016

Related U.S. Application Data

(63) Continuation of application No. PCT/JP2014/057125, filed on Mar. 17, 2014.

(30) Foreign Application Priority Data

Mar. 22, 2013 (JP) .................. 2013-059403

(51) Int. Cl.
| | |
|---|---|
| *H02P 5/00* | (2016.01) |
| *H02P 27/08* | (2006.01) |
| *B60L 3/00* | (2006.01) |
| *B60L 15/08* | (2006.01) |

(Continued)

(52) U.S. Cl.
CPC ............ *H02P 27/08* (2013.01); *B60L 3/0084* (2013.01); *B60L 3/0092* (2013.01); *B60L 15/08* (2013.01); *H02P 5/46* (2013.01); *H02P 5/74* (2013.01); *B60L 2220/42* (2013.01); *B60L 2220/44* (2013.01); *B60L 2240/429* (2013.01);

(Continued)

(58) Field of Classification Search
CPC .................... H02P 27/08; H02P 5/74

USPC .......................................... 318/51
See application file for complete search history.

(56) References Cited

U.S. PATENT DOCUMENTS

| | | | | |
|---|---|---|---|---|
| 7,463,003 | B2 * | 12/2008 | Toyonaga | .............. G05B 11/30 318/432 |
| 8,228,008 | B2 | 7/2012 | Kitanaka | |
| 2008/0303470 | A1 | 12/2008 | Schulz et al. | |

(Continued)

FOREIGN PATENT DOCUMENTS

| | | |
|---|---|---|
| CN | 101682277 A | 3/2010 |
| JP | 01-318598 | 12/1989 |

(Continued)

OTHER PUBLICATIONS

International Search Report mailed May 13, 2014 in corresponding international application PCT/JP2014/057125.

(Continued)

*Primary Examiner* — Eduardo Colon Santana
*Assistant Examiner* — Gabriel Agared (57) ABSTRACT

A motor drive device is provided which is able to reduce loss between a drive power source and a controller. The motor drive device includes a plurality of motors, a single drive power source which drives these motors, and a controller which controls energizing times during which motor coils of the plurality of motors are energized, by a PWM drive method. The controller includes phase shift portion which sets a PWM signal for causing a current to flow to the motor, into a phase different per motor. By the phase shift portion setting the PWM signal for causing a current to flow to the motor into a phase different per motor, so-called overlap of energizing times of currents is avoided.

4 Claims, 7 Drawing Sheets

(51) Int. Cl.
  *H02P 5/46* (2006.01)
  *H02P 5/74* (2006.01)
(52) U.S. Cl.
  CPC ............ *Y02T 10/644* (2013.01); *Y02T 10/645* (2013.01); *Y02T 10/648* (2013.01)

(56) References Cited

U.S. PATENT DOCUMENTS

| | | | |
|---|---|---|---|
| 2009/0160248 A1* | 6/2009 | Ang | B60K 6/445 307/9.1 |
| 2010/0171448 A1* | 7/2010 | Kitanaka | B60L 9/32 318/45 |
| 2011/0101906 A1* | 5/2011 | Tagome | H02K 3/28 318/722 |
| 2011/0260656 A1* | 10/2011 | Kazama | B60L 11/1803 318/85 |
| 2012/0074876 A1* | 3/2012 | Redler | B60L 15/32 318/41 |
| 2012/0235617 A1 | 9/2012 | Singh | |
| 2013/0106256 A1* | 5/2013 | Mizukoshi | H02M 7/48 310/68 D |
| 2013/0320677 A1 | 12/2013 | Yamada et al. | |

FOREIGN PATENT DOCUMENTS

| | | |
|---|---|---|
| JP | 2007-216930 | 8/2007 |
| JP | 2010-016981 | 1/2010 |
| JP | 2010-076752 | 4/2010 |
| JP | 2012-176634 | 9/2012 |
| JP | 2013-39033 | 2/2013 |

OTHER PUBLICATIONS

PCT International Preliminary Report on Patentability dated Oct. 1, 2015 in corresponding International Patent Application No. PCT/JP2014/057125.
Japanese Notification for Reasons of Rejection dated May 31, 2016 in corresponding Japanese Patent Application No. 2013-059403.
Chinese Office Action dated Dec. 7, 2016 from Chinese Patent Application No. 201480012636.6, 7 pages.
Extended European Search Report dated Dec. 21, 2016 from European Patent Application No. 14767981.5, 8 pages.
Japanese Office Action dated Dec. 27, 2016 from Japanese Patent Application No. 2013-059403, 4 pages.

* cited by examiner

SINUSOIDAL DRIVE(PWM)

MOTOR DRIVE DEVICE

CROSS REFERENCE TO THE RELATED APPLICATION

This application is a continuation application, under 35 U.S.C. §111(a), of international application No. PCT/JP2014/057125, filed Mar. 17, 2014, which is based on and claims Convention priority to Japanese patent application No. 2013-059403, filed Mar. 22, 2013, the entire disclosure of which is herein incorporated by reference as a part of this application.

BACKGROUND OF THE INVENTION

Field of the Invention

The present invention relates to a motor drive device used in, for example, an electric vehicle in which a plurality of motors are driven with a single drive power source.

Description of Related Art

Hitherto, an electric vehicle has been proposed in which motors for driving left and right wheels, respectively, are driven with a single drive power source (Patent Document 1). A controller which controls these motors includes, for example, an inverter which converts DC power of the drive power source into three-phase AC power to be used for driving the motors, and a PWM (Pulse Width Modulation) driver which controls the inverter. The inverter includes a plurality of semiconductor switching elements, and the PWM driver performs pulse width modulation of an inputted current command and sends ON/OFF commands to each of the semiconductor switching elements.

RELATED DOCUMENT

Patent Document

[Patent Document 1] JP Laid-open Patent Publication No. 2007-216930

When the plurality of motors are driven simultaneously by the PWM method with the single drive power source as described above, there is a problem that, as compared to the case where a drive power source is provided for each motor, copper loss between the drive power source and the controller increases as periods during which the respective motors are energized by the PWM driver overlap each other increasingly. The factors for the loss between the drive power source and the controller (inverter) include the internal resistance of the drive power source and the resistance of a harness.

SUMMARY OF THE INVENTION

An object of the present invention is to provide a motor drive device which is able to reduce loss between a drive power source and a controller.

Hereinafter, for convenience of easy understanding, a description will be given referring to the reference numerals in embodiments.

A motor drive device 6 of the present invention includes: a plurality of motors 4; a single drive power source 7 configured to drive the motors 4; and a controller 8 configured to control energizing times during which motor coils of the plurality of motors 4 are energized, by a PWM drive method. The controller 8 includes phase shift portion 10a configured to set a PWM signal for causing a current to flow to the motor 4, into a phase different per motor.

On an energizing path L1 between the drive power source 7 and the controller 8, while a voltage is constant, a current is divided into pulse-like waves. On an energizing path L2 between the controller 8 and the motors 4, a voltage is divided into pulse-like waves.

According to this configuration of the invention, the phase shift portion 10a of the controller 8 shifts the PWM signal for causing a current to flow to the motor 4 such that the PWM signal has a phase different per motor, whereby averaging can be performed such that overlap of pulse-like currents in the same time is reduced. That is, the phase shift portion 10a shifts an energizing time during which a current is applied to one of the motors 4 and an energizing time during which a current is applied to the other motor 4, and thereby can suppress an increase in a current value in the waveform diagram in which the currents applied to the motors 4 are combined. As described above, so-called overlap of energizing times of currents can be avoided. Thus, loss on the energizing path L1 between the drive power source 7 and the controller 8 can be reduced. This is because the loss on the energizing path L1 is, for example, simply proportional to an energizing time, and is proportional to the square of a current value. Therefore, the loss between the drive power source 7 and the controller 8 can be reduced by the phase shift portion 10a shifting the energizing time during which a current is applied to the motor 4.

The motors 4 may be mounted on a vehicle. In this case, the loss between the controller 8 and the battery 7 which is a drive power source mounted on the vehicle can be reduced. Thus, it is possible to improve the electric mileage or the gas mileage of the vehicle to increase the maximum travel range of the vehicle.

The motors 4 may be configured to drive wheels of an electric vehicle 1. The motors 4 configured to drive the wheels have higher output than a motor for each electric device. In this case, the effect of reducing the loss between the battery 7 and the controller 8 increases, and thus it is possible to improve the electric mileage of the electric vehicle 1 to further increase the maximum travel range of the electric vehicle 1.

The phase shift portion 10a may set a shift time Δt for the phase of the PWM signal as Δt=tw/n which is obtained by dividing one cycle tw of the PWM signal by the number n of the motors 4 to be driven by the controller 8. By setting the shift time Δt for the phase and shifting an energizing time during which a current is applied to one of the motors 4 and an energizing time during which a current is applied to the other motor 4, as described above, averaging can be performed such that overlap of pulse-like currents in the same time is reduced. Since the phases can be shifted with a simple arithmetic equation as described above, the load of arithmetic processing can be reduced.

The controller 8 may include a single calculation unit or arithmetic unit 10, and switching elements 11a which are respectively connected to the plurality of motors 4 to be driven. In this case, the entire structure of the motor drive device can be simplified to reduce the manufacturing cost. The controller 8 may include a plurality of calculation units 10, and the controller 8 may include: normal-time drive control unit 21 configured to, when the plurality of calculation units 10 are in a normal state, drive the respective motors 4 with the corresponding PWM signals having different phases by the plurality of calculation units 10; and abnormal-time drive control unit 22 configured to, when any one calculation unit 10 of the plurality of calculation units 10 is in an abnormal state, drive the motor 4 that has been driven by the abnormal calculation unit 10, by another calculation unit 10. Even when it is determined that one of the calculation units 10 is in an abnormal state, the motors 4 can be driven by another normal calculation unit 10 that is not determined as being in an abnormal state. In this case, for example, a control system is more complicated than when the controller 8 includes a single calculation unit, but can have redundancy.

Each of the motors 4 may form a part of an in-wheel motor unit 3 which is partially or entirely disposed within a wheel and which includes the motor 4, a wheel bearing, and a reducer 5. In addition, the motors 4 may be motors for driving pads of electric braking devices mounted on a vehicle.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A motor drive device according to a first embodiment of the present invention will be described with reference to FIG. 1 to FIG. 6. The following description also includes a description regarding a method of controlling the motor drive device.

Figure 1:
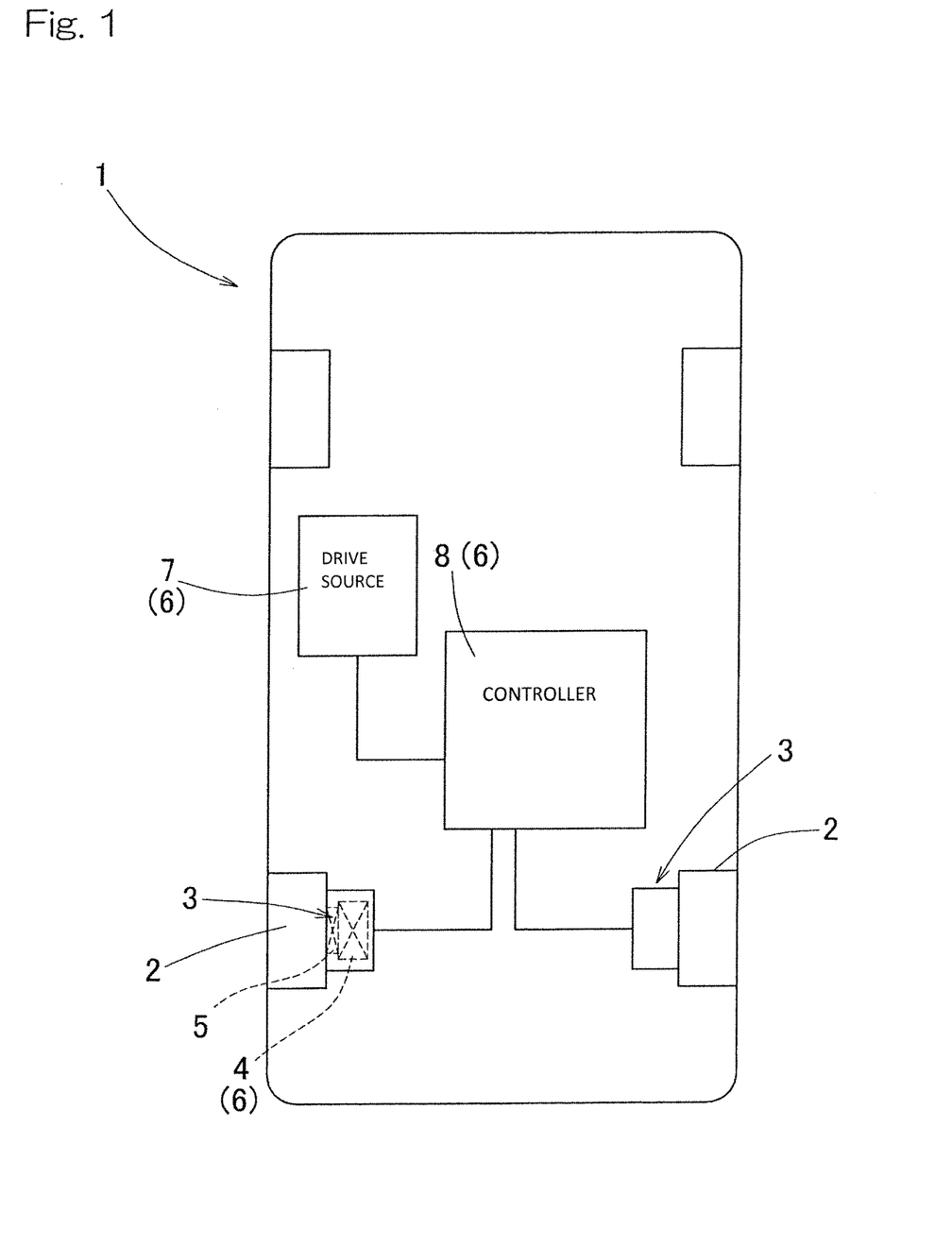
FIG. 1 is a diagram schematically showing the arrangement configuration of components in an electric vehicle equipped with a motor drive device according to a first embodiment of the present invention.

FIG. 1 is a diagram schematically showing the arrangement configuration of components in an electric vehicle equipped with the motor drive device of this embodiment. As shown in FIG. 1, the electric vehicle 1 includes in-wheel motor units 3, 3 disposed in left and right rear wheels 2, 2, respectively, which are drive wheels, and is driven to move with these in-wheel motor units 3, 3. It should be noted that a fuel cell vehicle may be used instead of the electric vehicle.

Each of the in-wheel motor units 3, 3 includes, for example, a motor 4, a reducer or reduction gear 5 which reduces the speed of rotation of the motor 4, and a wheel bearing which is not shown, and a part or the entirety of each in-wheel motor unit 3 is disposed within the wheel. The motor drive device 6 according to this embodiment includes a plurality of (two in this example) motors 4, a single drive power source 7 which drives these motors 4, and a controller 8 which controls energizing times during which motor coils of the plurality of motors 4 are energized, by a PWM drive method.

Figure 2A:
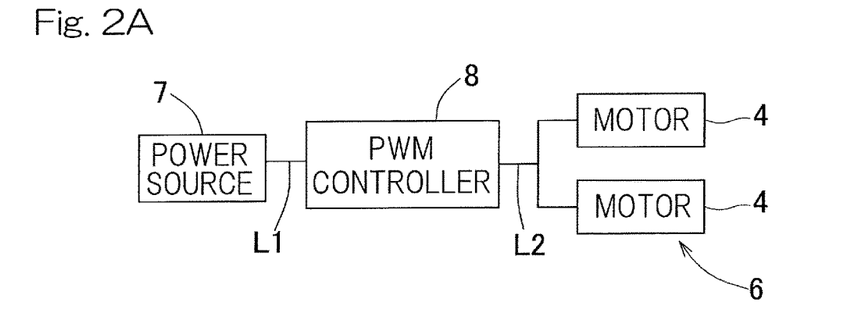
FIG. 2A is a block diagram schematically showing the basic configuration of a circuit of the motor drive device.
Figure 2B:
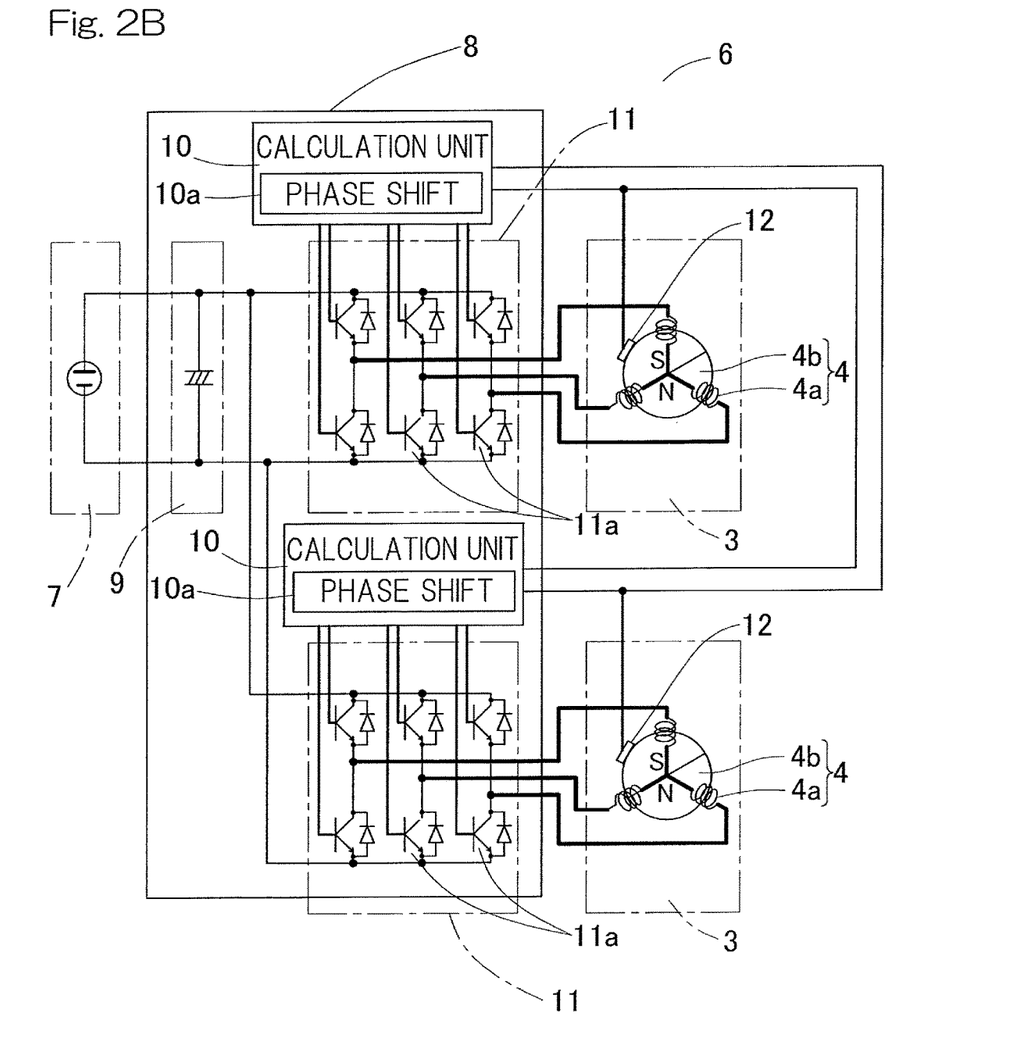
FIG. 2B is a circuit diagram schematically showing an example of the circuit configuration of the motor drive device.

FIG. 2A is a block diagram schematically showing the basic configuration of a circuit of the motor drive device 6, and FIG. 2B is a circuit diagram schematically showing an example of the circuit configuration of the motor drive device 6. As shown in FIG. 2B, each motor 4 is, for example, a synchronous motor which includes a stator 4a including motor coils of three phases U, V, and W, and a rotor 4b composed of a permanent magnet. The controller 8 of the motor drive device 6 includes, for example, a smoothing circuit 9, a plurality of calculation units 10, 10, and a plurality of motor drive circuits 11 which are respectively connected to the plurality of motors 4, 4 to be driven. Each of the motor drive circuits 11 includes a plurality of switching elements 11a. It should be noted that a cooler (not shown) which cools each switching element 11a may be provided in the controller 8.

DC power supplied from the drive power source 7 is smoothed by the smoothing circuit 9 and is inputted to the respective switching elements 11a corresponding to the plurality of motors 4. The motor drive device 6 controls large current when driving the in-wheel motor units 3, 3, and thus needs the smoothing circuit 9 composed of a capacitor, at the input stage, for the purpose of reduction of influence of so-called inrush current, etc. The plurality of switching elements 11a forming the motor drive circuit 11 including an inverter are composed of, for example, a plurality of power drive elements such as switching transistors, and the DC power inputted through the smoothing circuit 9 is converted to three-phase AC power through intermittent control of the drive elements by the calculation unit 10 and supplied to the motor 4. It should be noted that in this example, the corresponding calculation units 10, 10 are provided for the respective motors, but the present invention is not limited to this example.

In each calculation unit 10, timing of the intermittent control of the drive elements of the motor drive circuit is determined on the basis of a rotation phase of each rotor 4b which is detected by a phase detector 12 provided to each motor 4. In addition, each calculation unit 10 has a function of communicating between the calculation units, and a function of communicating with an ECU 13 (FIG. 3) which is primary controller which is disposed in the vehicle and configured to perform integrated control of electric devices of the vehicle.

Figure 3:
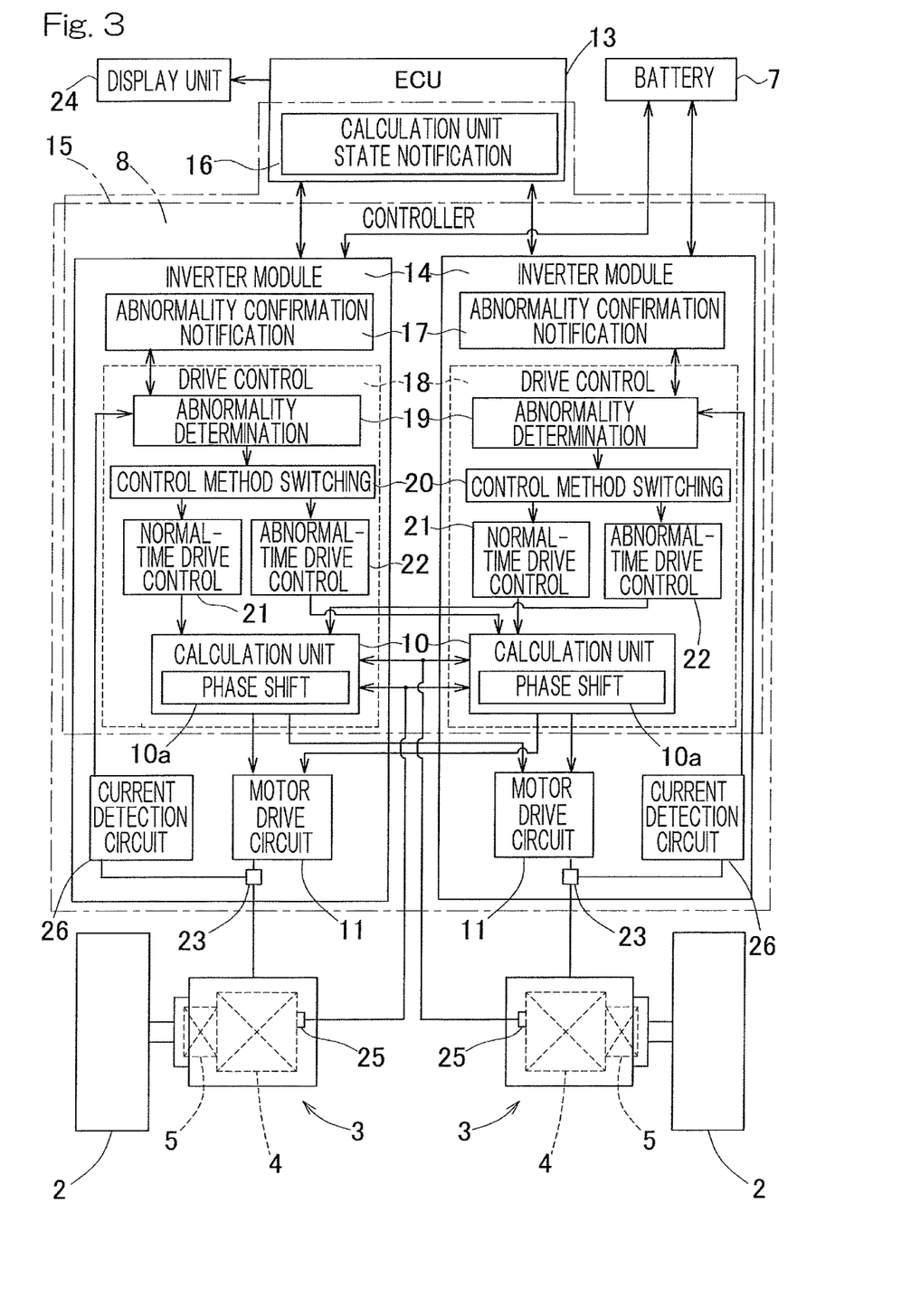
FIG. 3 is a block diagram of a control system of the motor drive device.

FIG. 3 is a block diagram of a control system of the motor drive device. As shown in FIG. 3, the ECU 13, the controller 8 including a plurality of inverter modules 14, a battery which is the drive power source 7, and the motors 4 are mounted on a vehicle body. The ECU 13 is primary controller configured to perform general integrated control of the vehicle and send a command to each inverter module 14, and they are mutually connected via a control area network (abbreviated as CAN) or the like.

Each inverter module 14 controls the corresponding motor 4 in accordance with a command from the ECU 13. The ECU 13 includes a computer, programs to be executed by the computer, and various electronic circuits. A common computer or electronic circuits on a common board may form light current systems for the ECU 13 and each inverter module 14.

The ECU 13 includes torque allocation section (not shown) configured to generate an accelerating/decelerating command as a torque value, which is to be sent to the motors 4, 4 for driving the left and right wheels, based on a signal indicating accelerating degree outputted from an accelerator (not shown), a decelerating command outputted from a brake (not shown), and a cornering command outputted from a steering wheel (not shown), and to send the accelerating/decelerating command to each inverter module 14. The battery 7 is used for driving the motors 4 and used as a power source for an entire electrical system of the vehicle.

The motor drive device includes left-right wheel cooperative drive control section 15 configured to perform cooperative control of the left and right motors 4, 4. In this example, the left-right wheel cooperative drive control section 15 includes calculation unit state notification portion 16 provided in the ECU 13, and abnormality confirmation notification unit 17 and drive control section 18 which are provided in each inverter module 14. Each drive control section 18 includes abnormality determination unit 19, control method switching unit 20, normal-time drive control unit 21, abnormal-time drive control unit 22, and the calculation unit 10. When each of the plurality of calculation units 10 is in a normal state, the normal-time drive control unit 21 converts an accelerating/decelerating command such as a torque command sent from the ECU 13, to a current command, and sends the current command to the calculation unit 10. The normal-time drive control unit 21 obtains a value of current to be applied to the motor 4, and performs current feedback control. In addition, the normal-time drive control unit 21 obtains a rotation angle of the rotor of the motor 4 from an angle sensor (not shown), and performs vector control.

The abnormality determination unit 19 obtains the current which is outputted from the motor drive circuit 11 and measured by a current detection sensor 23, from a current detection circuit 26, and determines whether abnormality has occurred in the calculation unit. For example, this abnormality determination unit determines whether at least one of three phase (U-phase, V-phase, W-phase) output currents outputted from the motor drive circuit 11 falls outside a determined threshold range with respect to a motor applied voltage. For example, a reference value of output current with respect to a motor applied voltage is previously obtained through an experiment, simulation, or the like, and a value obtained from the output current by taking, for example, a safety factor into account is set as the threshold. For example, when the abnormality determination unit 19 determines that at least one of the three phase (U-phase, V-phase, W-phase) output currents outputted from the motor drive circuit 11 falls outside the determined threshold range, the abnormality determination unit 19 determines that the calculation unit 10 is in an abnormal state. When the abnormality determination unit 19 determines that all the three phase (U-phase, V-phase, W-phase) output currents fall within the threshold range, the abnormality determination unit 19 determines that the calculation unit 10 is in a normal state.

When the abnormality determination unit 19 determines that the calculation unit 10 is in a normal state, intermittent control of each drive element of the motor drive circuit 11 is performed using the calculation unit 10 by the normal-time drive control unit 21 which is selectively switched to operate by the control method switching unit 20. When the abnormality determination unit 19 determines that the calculation unit 10 is in an abnormal state, intermittent control of each drive element of the motor drive circuit 11 is performed using the other calculation unit 10 by the abnormal-time drive control unit 22 which is selectively switched to operate by the control method switching unit 20.

The abnormality confirmation notification unit 17 is configured to output abnormality occurrence information to the calculation unit state notification portion 16 of the ECU 13 when the abnormality determination unit 19 determines that the calculation unit 10 is in an abnormal state. Upon reception of the abnormality occurrence information outputted from the abnormality confirmation notification unit 17, for example, the calculation unit state notification portion 16 of the ECU 13 causes a display unit 24 at a driver's seat to display notifying of the abnormality, and at the same time, the calculation unit state notification portion 16 sends, to the abnormality confirmation notification unit 17 in the inverter module 14 at the normal calculation unit side, notice of the abnormality of the other calculation unit 10.

Figure 4:
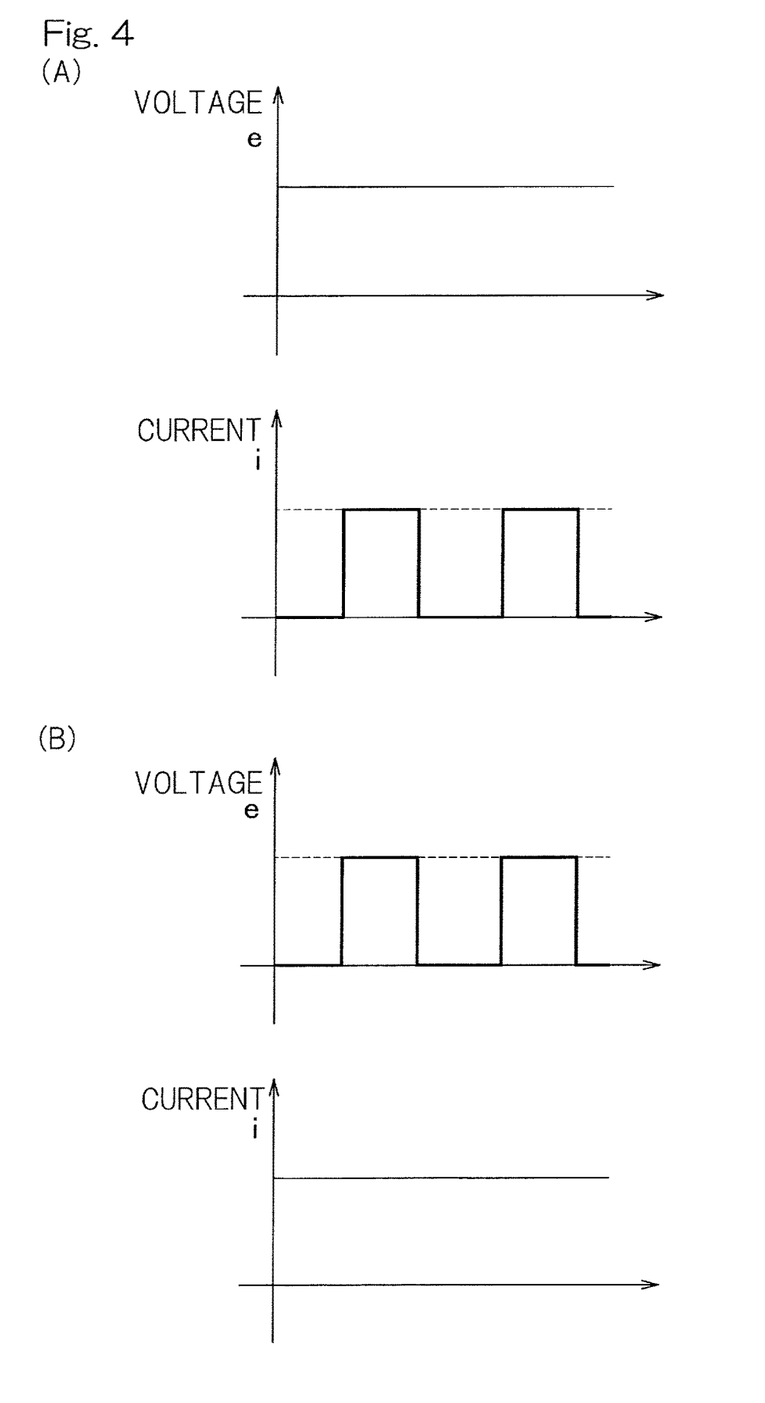
FIG. 4 shows a waveform diagram in which Chart (A) shows a voltage and a current between a drive power source and a controller and Chart (B) shows a voltage and a current between the drive power source and motors.

On an energizing path L1 between the drive power source 7 and the controller 8 which is shown in FIG. 2A, while a voltage is constant, a current is divided into pulse-like waves as shown in Chart (A) of FIG. 4. On an energizing path L2 between the controller 8 and the motors 4 which is shown in FIG. 2A, a voltage is divided into pulse-like waves as shown in Chart (B) of FIG. 4.

As shown in FIG. 3, each calculation unit 10 includes phase shift portion 10a configured to set a PWM signal for causing a current to flow to the motor 4, into a phase different per motor, in order to avoid so-called overlap of energizing times of currents on the energizing path L1 between the drive power source 7 and the controller 8. The phase shift portion 10a sets a shift time At for the phase of the PWM signal, as $\Delta t = tw/n$ which is a value obtained by dividing one cycle tw of the PWM signal by the number n ($n=2$ in this example) of the motors 4 to be driven by the controller 8. For example, on the basis of a time when an ON operation of each drive element for one motor which is detected by the phase detector 25 starts, that is, a time of rising, the phase shift portion 10a shifts a time of start of an ON operation of each drive element for the other motor by the shift time $\Delta t$.

Figure 5:
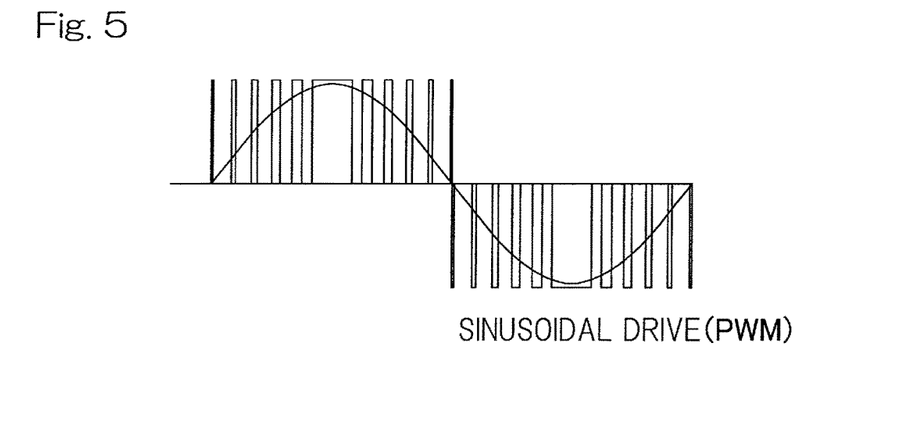
FIG. 5 is a waveform diagram showing a drive current waveform of the motor during motor driving in the motor drive device.

FIG. 5 is a waveform diagram showing a drive current waveform of the motor 4 during motor driving in the motor drive device. Each calculation unit 10 (FIG. 3) causes a sinusoidal current to flow through the coils of the stator of the motor by turning on and off the drive elements of the motor drive circuit through PWM control.

Figure 6:
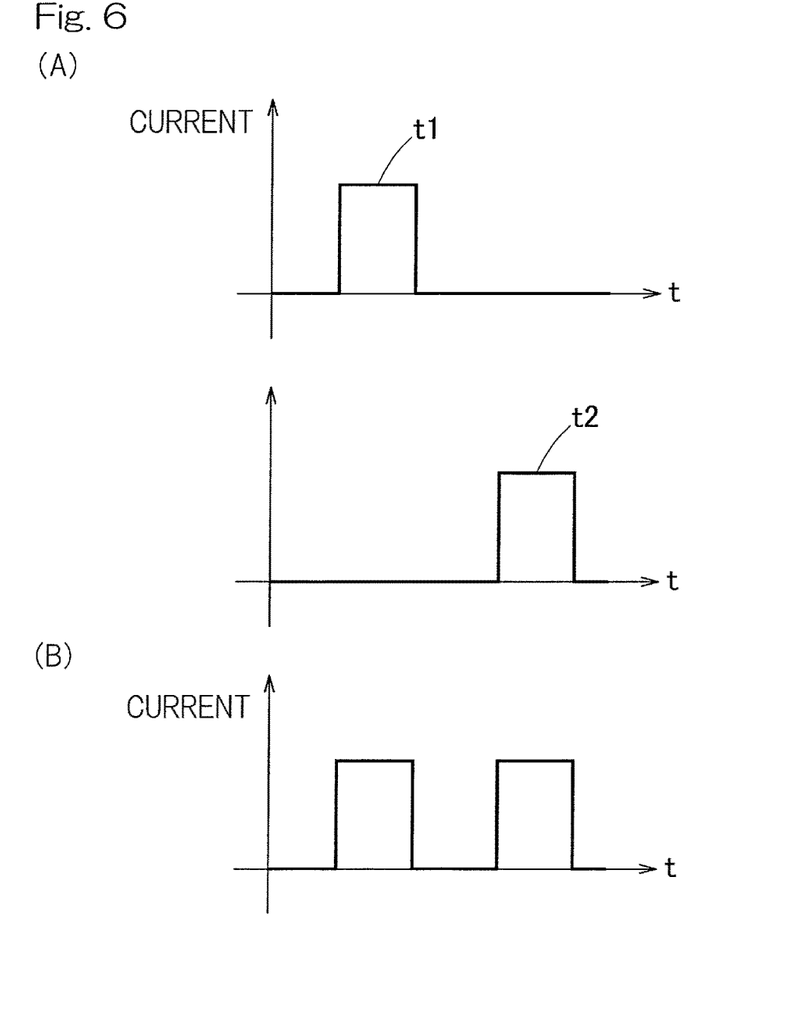
FIG. 6 shows a waveform diagram in which Chart (A) shows that energizing times during which a plurality of motors are energized are shifted and Chart (B) shows that currents applied to the plurality of motors are combined.
Figure 8:
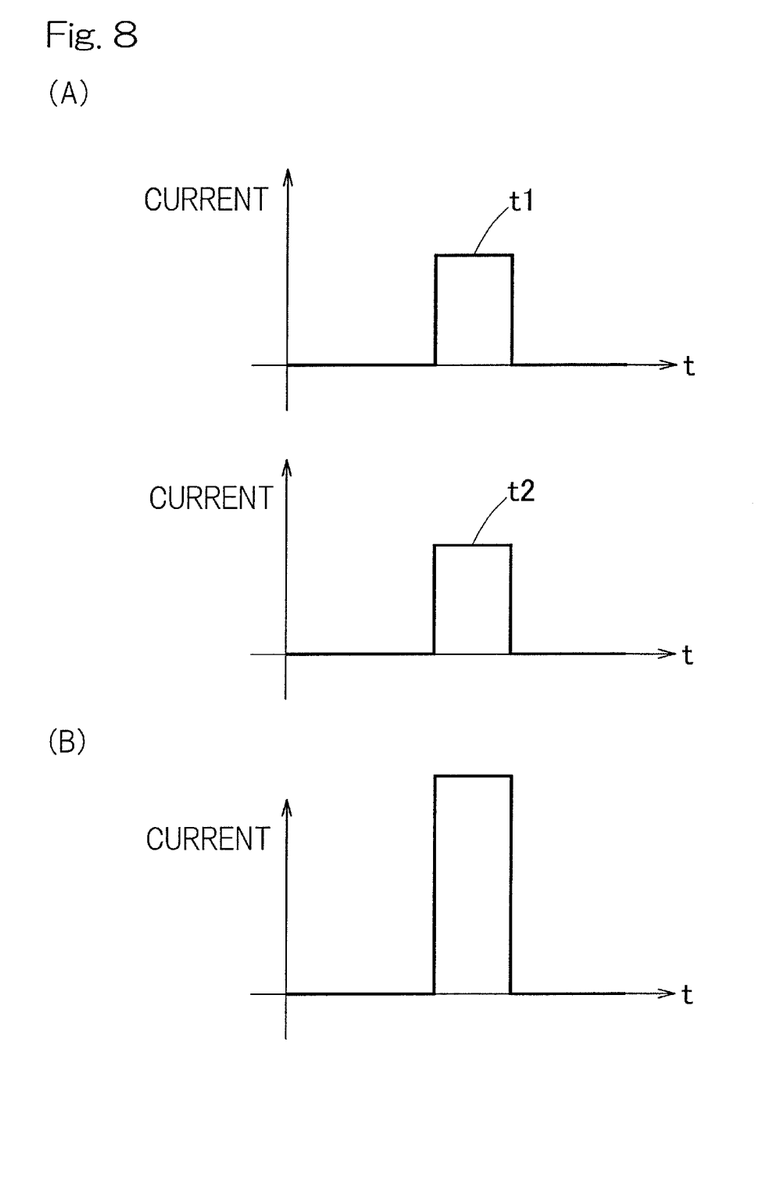
FIG. 8 shows a waveform diagram in which Chart (A) shows, according to a conventional example, that energizing times during which a plurality of motors are energized are the same and Chart (B) shows that currents applied to the plurality of motors are combined.

Chart (A) of FIG. 6 shows waveforms in which energizing times t1, t2 during which a plurality of motors are energized are shifted, and Chart (B) of FIG. 6 shows waveforms in which currents applied to the plurality of motors are combined. Meanwhile, Chart (A) of FIG. 8 shows waveforms, according to a conventional example, in which energizing times t1, t2 during which a plurality of motors are energized are the same, and Chart (B) of FIG. 8 shows waveforms in which currents applied to the plurality of motors are combined. Loss on the energizing path between the drive power source and the controller is, for example, simply proportional to an energizing time, and is proportional to the square of a current value.

Therefore, as shown in Charts (A) and (B) of FIG. 6, each phase shift portion 10a (FIG. 3) shifts the energizing time during which current is applied to the motor, whereby averaging can be performed such that overlap of pulse-like wave currents in the same time is reduced. The phase shift portion 10a shifts an energizing time during which a current is applied to one of the motors 4 and an energizing time during which a current is applied to the other motor 4, and thereby can suppress an increase in a current value in the waveform diagram in which the currents applied to the motors 4 are combined. As described above, so-called overlap of energizing times of currents can be avoided. Thus, the loss between the drive power source and the controller can be reduced. For example, in the case of a DC motor having an energizing time of 50% or less, copper loss between the drive power source and the controller is 50%.

In addition, since each motor 4 is mounted on the vehicle, loss between the controller 8 and the battery 7 which is a drive power source mounted on the vehicle can be reduced. Thus, it is possible to improve the electric mileage of the vehicle to increase the maximum travel range of the vehicle.

The phase shift portion 10a shown in FIG. 3 shifts the energizing times during which the plurality of motors 4 are energized, regardless of whether any one of the calculation units 10 is in an abnormal state or in a normal state. Even when abnormality occurs in any one of the calculation units 10, the phase shift portion 10a of the other calculation unit 10 shifts the energizing time during which a current is applied to each motor 4. In this embodiment, the energizing times during which the plurality of motors 4 are energized are shifted on the basis of the time of start of each ON operation, but the present invention is not limited to this example. For example, the energizing times during which the plurality of motors 4 are energized may be shifted on the basis of the center of the time of each ON operation.

The controller 8 includes the plurality of calculation units 10 and also includes the normal-time drive control unit 21 and the abnormal-time drive control unit 22. Thus, even when it is determined that one of the calculation units 10 is in an abnormal state, the motors 4 can be driven by the other normal calculation unit 10. In this case, for example, the control system is more complicated than when the controller 8 includes a single calculation unit, but can have redundancy.

Figure 7:
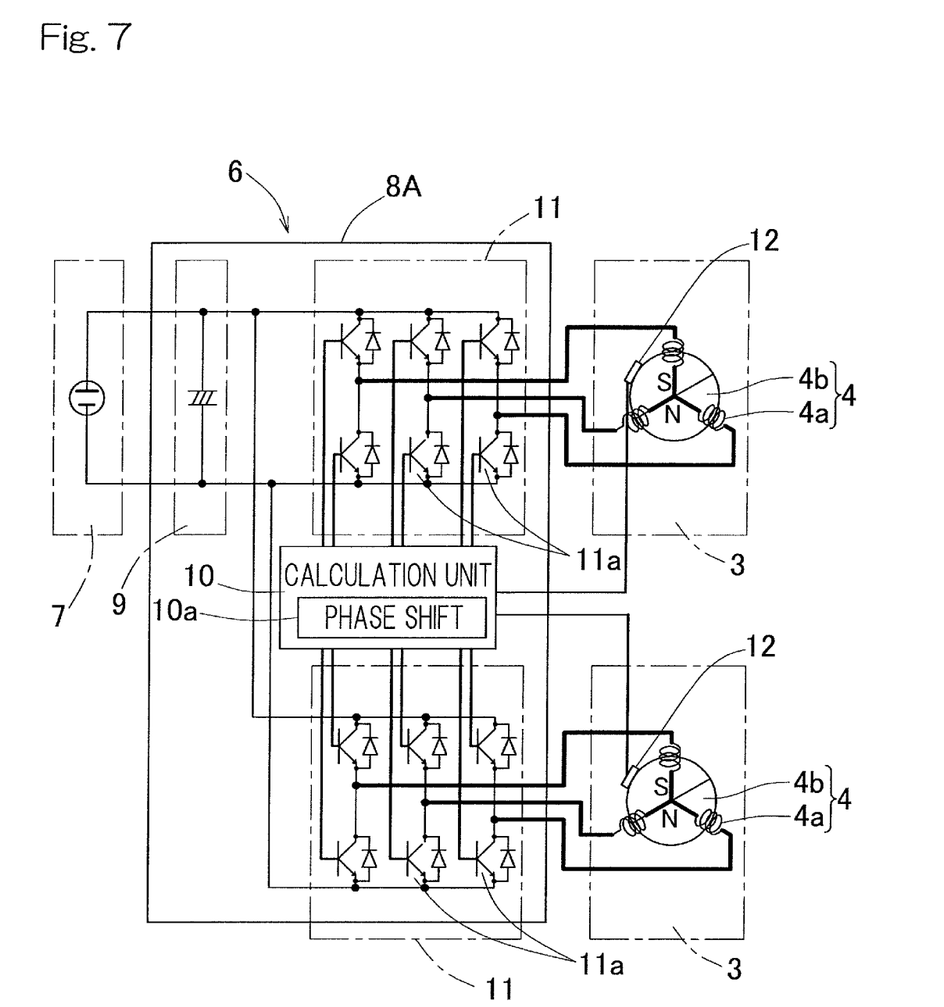
FIG. 7 is a diagram schematically showing an example of the circuit configuration of a motor drive device according to another embodiment of the present invention.

FIG. 7 is a diagram schematically showing an example of the circuit configuration of a motor drive device according to another embodiment. As shown in FIG. 7, a controller 8A may include a single calculation unit 10, and switching elements 11a which are respectively connected to motors 4 to be driven. The calculation unit 10 causes a sinusoidal current to flow through the coils of the stator 4a of each motor 4 by turning on and off the drive elements of each motor drive circuit through PWM control. In this case, the phase shift portion 10a of the calculation unit 10 shifts the phases of current values for the respective motors 4, and outputs the current values respectively. In this case, since the calculation unit 10 can be shared, the entire structure of the motor drive device can be simplified as compared to that in the first embodiment, to reduce the manufacturing cost.

The vehicle may be a hybrid vehicle in which either left and right front wheels or left and right rear wheels are driven by the in-wheel motor unit and the other wheels are driven by an internal combustion engine.

In each embodiment, the motor drive device is applied to the motors for driving wheels, but may be applied to, for example, motors for driving pads of electric braking devices mounted on a vehicle, or motors for driving electric devices.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed within the scope.

REFERENCE NUMERALS

1 . . . electric vehicle
2 . . . rear wheel (drive wheel)
4 . . . motor
6 . . . motor drive device
7 . . . drive power source
8 . . . controller
10 . . . calculation unit
10a . . . phase shift portion
11 . . . motor drive circuit
11a . . . switching element
21 . . . normal-time drive control unit
22 . . . abnormal-time drive control unit

What is claimed is:

1. A motor drive device comprising:
a plurality of motors;
a single drive power source configured to drive the motors; and
a controller configured to control energizing times during which motor coils of the plurality of motors are energized, by a PWM drive method,
wherein the controller includes
a phase shift portion configured to set a PWM signal for causing a current to flow to the motor, into a phase different per motor, the phase shift portion setting a shift time $\Delta t$ for the phase of the PWM signal as $\Delta t = tw/n$ which is obtained by dividing one cycle tw of the PWM signal by the number n of the motors to be driven by the controller;
a plurality of calculation units;
a normal-time drive control unit configured to, when the plurality of calculation units are in a normal state, drive the respective motors with the corresponding PWM signals having different phases by the plurality of calculation units; and
an abnormal-time drive control unit configured to, when any one calculation unit of the plurality of calculation units is in an abnormal state, drive the motor that has been driven by the abnormal calculation unit, by another calculation unit.

2. The motor drive device as claimed in claim 1, wherein the motors are mounted on a vehicle.

3. The motor drive device as claimed in claim 2, wherein the motors are configured to drive wheels of an electric vehicle.

4. The motor drive device as claimed in claim 1, wherein the controller includes a single calculation unit, and switching elements which are respectively connected to the plurality of motors to be driven.

* * * * *